W. A. LINQUIST.
AUTOMOBILE FENDER AND COÖPERATING DEVICE.
APPLICATION FILED FEB. 16, 1911.
1,033,425.
Patented July 23, 1912.
3 SHEETS—SHEET 1.
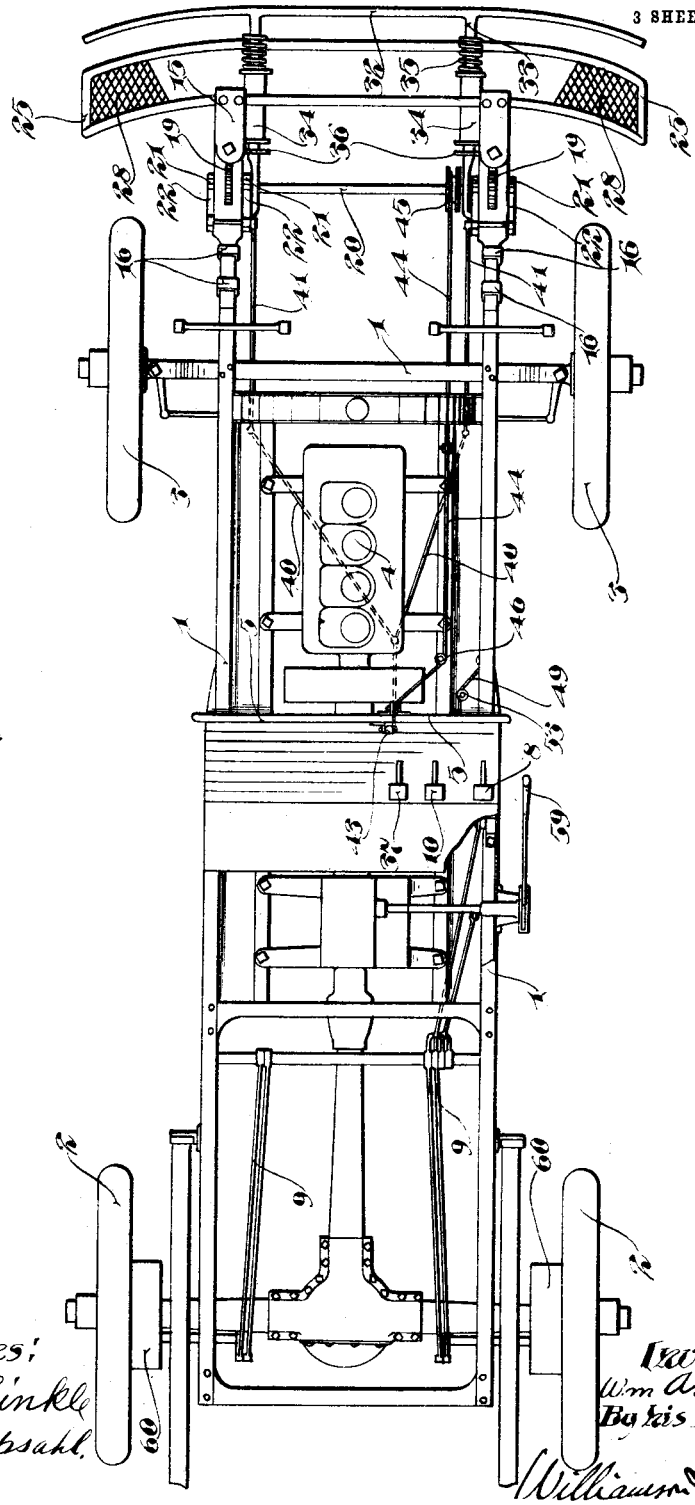
Witnesses:
E. C. Skinkle
Harry Opsahl.
Inventor:
Wm A. Linquist
By his Attorneys
Williamson & Merchant

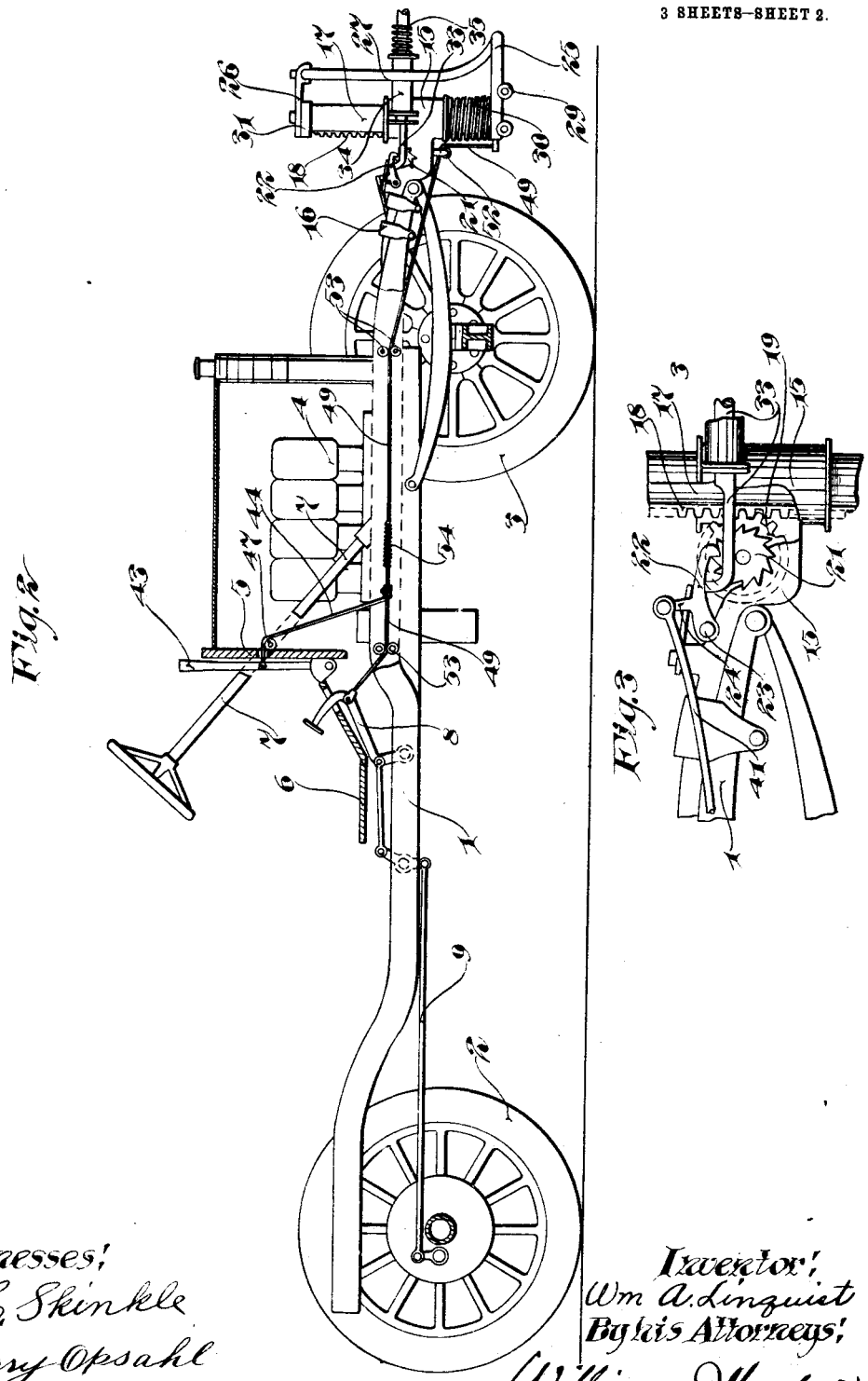

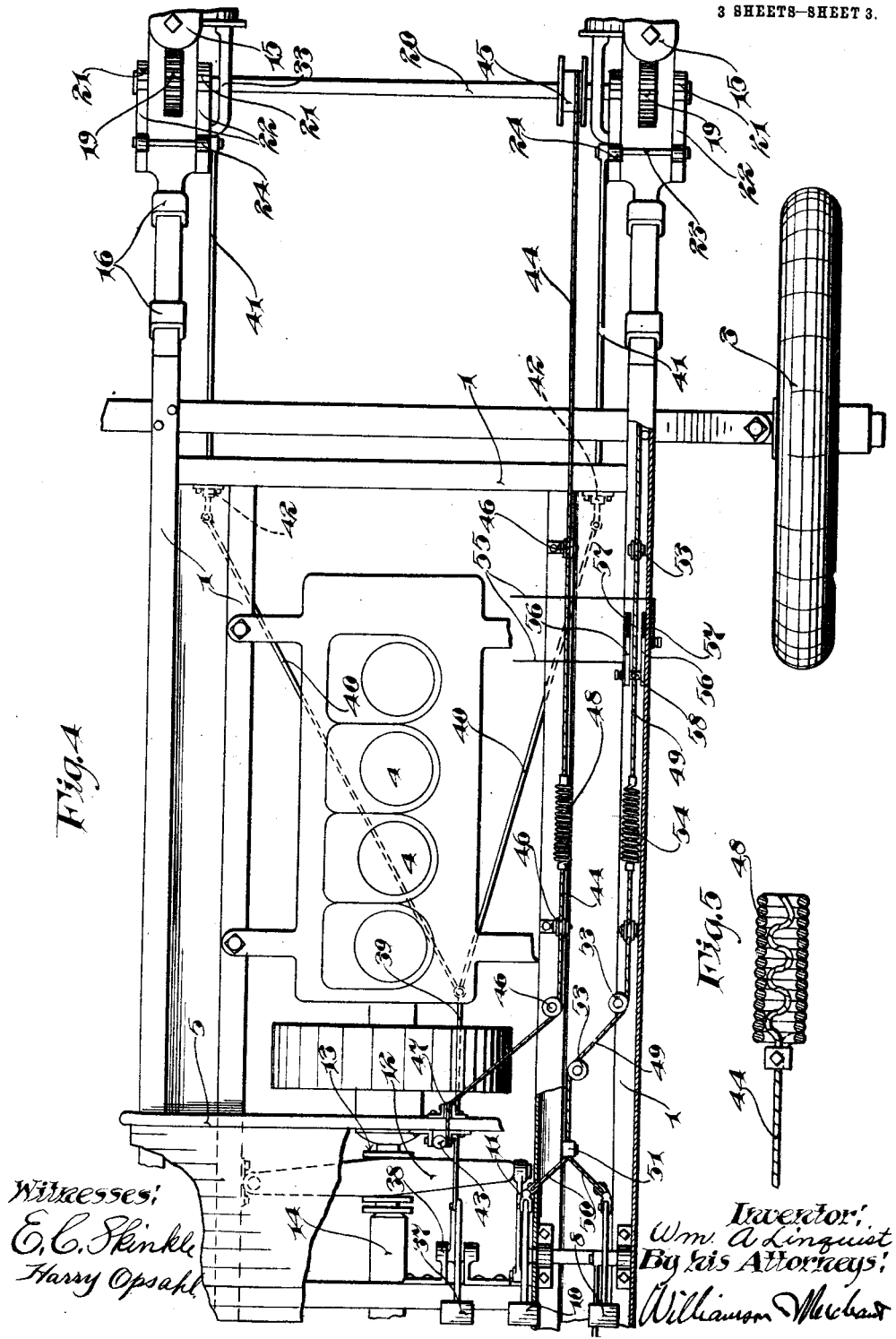

UNITED STATES PATENT OFFICE.

WILLIAM A. LINQUIST, OF MINNEAPOLIS, MINNESOTA.

AUTOMOBILE-FENDER AND COÖPERATING DEVICE.

1,033,425.

Specification of Letters Patent. Patented July 23, 1912.

Application filed February 16, 1911. Serial No. 608,997.

*To all whom it may concern:*

Be it known that I, WILLIAM A. LIN-QUIST, a citizen of the United States, residing at Minneapolis, in the county of Hennepin and State of Minnesota, have invented certain new and useful Improvements in Automobile-Fenders and Coöperating Devices; and I do hereby declare the following to be a full, clear, and exact description of the invention, such as will enable others skilled in the art to which it appertains to make and use the same.

My present invention relates particularly to automobiles having fenders that are normally held in inoperative positions but which are adapted to be tripped automatically, or otherwise, and which, when tripped, are moved into their operative positions close to the ground. In the present instance, the fender illustrated is that disclosed and claimed in my prior application S. N. 590,462, filed November 3rd, 1910, entitled "Automatic fender for automobiles". But so far as the broad idea of my invention is concerned, various forms of fenders may be employed.

In this invention I provide, in connection with a fender or guard located at the front of the machine, means whereby movement of the said fender or guard from its normal position will set the brakes of the vehicle and throw the motor out of action. In the preferred embodiment of the invention, it is applied to an automobile or other motor propelled vehicle having an explosive engine as its propeller motor and including in its transmission mechanism a clutch for rendering the driving connections inoperative. In the application of my invention to such a vehicle, the connections actuated by movement of the fender or guard from its normal position are arranged to accomplish three important results, to-wit. to automatically set the brake, to automotically open the said transmission clutch, and to open a circuit breaker of the engine igniter circuit. Preferably, all three of the above noted automatic connections are accomplished approximately simultaneously.

In the accompanying drawings which illustrate the invention, applied to an automobile of ordinary construction, like characters indicate like parts throughout the several views.

Referring to the drawings, Figure 1 is a plan view of the automobile with most parts of the body thereof removed and showing my invention applied thereto; Fig. 2 is a view partly in side elevation and partly in vertical section showing the automobile and attachment with the main portion of the body thereof removed; Fig. 3 is an enlarged detail in side elevation showing means for supporting the fender and for tripping the same, some parts being broken away; Fig. 4 is an enlarged plan view with some parts sectioned and some parts broken away showing approximately the front half portion of the automobile and the attachment thereto; and Fig. 5 is a detail view partly in plan and partly in section showing on a larger scale than in the other views, one of the flexible tripping connections having a limit elasticity.

Of the standard parts of an automobile, in so far as it is desirable for the purposes of this case to note, the numeral 1 indicates the framework; the numeral 2 the rear or traction wheels; the numeral 3 the front wheels; the numeral 4 the explosive engine; the numeral 5 the dashboard at the front of the footboard 6; the numeral 7 the steering post; the numeral 8 the foot actuated brake lever which operates the friction brakes in the customary way through intermediate connections 9; and the numeral 10 indicates the foot actuated clutch lever which, as shown, is connected by a link 11, in the ordinary way, to the clutch shipper lever 12, which latter operates the ordinary clutch 13 of the engine driven transmission shaft 14. The parts so far enumerated are taken from a standard automobile, but they may be of any other construction.

The fender may be attached to the automobile in different ways but is preferably attached, as shown in the drawings, by means of strong bearing brackets 15 rigidly secured to the front ends of the side bars of the frame 1, by clamps 16 or other suitable means. The forwardly projecting ends of the bearing brackets 15 are formed with vertical seats through which plunger bars 17 are arranged to work vertically. These plunger bars are shown as provided on their rear faces with racks 18 that mesh with small under gears 19 secured to a transverse countershaft 20, the ends of which are journaled in the said bearing brackets 15. The shaft 20 at its ends outside of the bearing brackets 15 is provided with ratchet wheels 21 that are engaged by retaining pawls 22 shown as pivoted to short shafts 23 journaled in bearings on the brackets 15 and provided at their inner ends with upwardly extended arms 24. As shown, the pawls 22 are spring held for action on the ratchet wheels 21.

The plunger bars 17 constitute vertically movable elements of the fender, and to the lower ends thereof are rigidly secured forwardly projecting tie bars 25, while to the upper ends of said plungers are secured shorter tie bars 26. The said upper and lower tie bars serve to support, in an approximately upright position, an approximately rectangular marginal frame 27 preferably made of metal tubing and having attached to it a strong flexible network 28, the lower portion of which is forwardly projected so that the said netting and frame are adapted to catch a person run down by the machine.

For direct engagement with the ground, the lower tie bars 25 are provided with small wheels 29 which avoid undue frictional contact with the ground. Heavy coiled springs 30 are applied around the plunger 17 and are compressed between the tie bars 25 and the bearing brackets 15 and exert force tending to throw the fender downward from its normal or raised position into a lowered position. The said fender is normally held in its raised position against the tension of the said springs 30 by the engagement of the retaining pawls 21. Also, the pawl and ratchet device made up of the pawls and ratchet wheels are adapted to hold the fender in variable or different raised positions.

The fender is adapted to be released by raising or moving the pawl 22 out of engagement with the ratchet wheel 21, and provision is herein made for accomplishing this either automatically or at will.

The numeral 31 indicates leather or other pliable washers applied to the upper ends of the plunger bars 17 to absorb shocks and to prevent the fender from being thrown too violently into engagement with the ground. Washers or stop devices of this kind may be applied in any number or may have any desired thickness to set the fender in proper engagement with the ground when lowered.

The automatic means for tripping the fender is preferably in the form of a transverse tripping bar or guard 32 located in front of the fender and provided with rearwardly extended arms 33 mounted in bearings 34 on the sides of the bearing brackets 15. The rear ends of the arms 33 are shown as turned upward for engagement with the inclined under edges of the retaining pawls 22 so that when the said tripping bar and its arms are pressed rearward, the latter will release the said pawls 22 out of engagement with the coöperating ratchet wheels 21 and thus release the fender. Coiled springs 35 applied on the arms 33 and compressed between the bearings 34 and the tripping bar 32 yieldingly press the said parts 32 and 33 forward as far as permitted by stops 36 on the said arms which engage with the rear ends of the said bearings 34.

The means for tripping or releasing the fender at will preferably includes a foot actuated trip lever 37 pivoted to a suitable bearing 38 on a cross bar of the frame 1 and connected to the rear end of a rod 39, which, in turn, is connected by forwardly diverging rods or connections 40. The front ends of the rods 40 are pivotally connected to the rear portion of rods 41 mounted to slide through suitable bearings 42 on a cross bar of the frame 1 and pivotally attached at their front ends to the, before noted, upwardly extended arms 24 on the inner ends of the pawl shafts 23. When the foot tripping lever 37 is stepped upon, the retaining pawls 22 will be raised out of engagement with the coöperating ratchet wheels 21 and the fender will be released.

To adapt the fender to be restored to its raised position after it has once been tripped without requiring the operator to leave the car, a hand lever 43 is pivotally connected to the footboard 6 and is connected by a suitable cable 44 to a windlass drum or sheave 45 secured on the front shaft 20. This cable 44 is guided by sheaves 46 and 47 mounted respectively on the frame 1 and on the so-called dashboard 5. The lever 43, cable 44, and drum 45 are so arranged that when the said lever is given extreme rearward and downward movement, it will unwind the front end of the cable from the drum 45 and thereby rotate the shaft 20, and through the gears 19 and racks 18, will lift the fender into its raised position shown in the drawing. The slack, which is normally in the cable 44, is taken up by a coiled spring 48 through which the said cable is passed, but to which cable the ends of the said spring are rigidly secured, as will be more fully apparent after consideration of a similar connection illustrated in detail in Fig. 5, and presently to be described. This spring 48 normally holds the lever 43 in its forward position shown in Fig. 2, and it will be understood that the kinked portion of the cable contained within said spring, has sufficient slack to permit the said fender to be lowered when released.

The means for causing the lowering movement of the fender to automatically set the brake, releases the driving clutch and breaks the sparking circuit of the engine igniter, may take various forms but, as shown, comprises a cable 49 which, at its front end, is shown as attached to the right-hand bar 25 of the fender. The rear end of this cable 49 is provided with short branches 50 shown as connected thereto by a coupling 51. One of these cable branches 50 is attached to the foot actuated brake lever 8 and the other cable branch is attached to the foot actuated clutch lever 10. The intermediate portion of the said cable 49 is guided by sheaves 52 and 53 applied, respectively, to the righthand bearing bracket 15 and to the righthand side of the frame 1.

The intermediate portion of the cable 49 is passed through a coiled spring 54 and the ends of said spring are attached thereto. Normally, the cable is stretched taut through the spring 54, but it will take up slack in the cable when one or the other or both of the foot levers 8 and 10 are stepped upon and operated in the usual way. It will now be understood that when the fender is released and is thrown downward by the relatively strong springs 30, the cable 49 will be drawn forward and will move the levers 8 and 10 in the same manner as if they had been stepped upon or pressed by the foot; and this, as is obvious, will simultaneously set the brakes and throw the clutch of the driving shaft into a releasing position so that the machine will be automatically and quickly brought to a stop. This same forward movement of the cable 49 breaks the sparking circuit of the engine igniter preferably as follows: The numeral 55 indicates leads of the engine igniter which are connected to fixed connections 56 shown as secured on the right hand bar of the machine frame 1. The contacts 56 are insulated from each other, as shown, by insulating strips 57, shown in Fig. 4 as forming front end extensions of the said contacts. A movable contact 58 is attached to the cable 49 and normally closes the circuit between the contacts 56. When the cable 49 is thrown forward by the lowering movement of the fender, the movable contact 58 is slid forward into engagement with the insulated portions 57 thereby breaking the igniter circuit which, of course, results in stopping of the engine.

In the improved fender, with its attachment described, it will be seen that if a person should be run into, the impact that the collision would produce by contact with the tripping bar 32 would trip the fender and permit the same to assume its lowered position in time to pick up the person struck, and instantly and automatically all of those several actions which would be required to quickly stop the machine and bring the engine at a rest, are accomplished. At the same time, the brake setting and clutch actuating levers are capable of being used in the ordinary way without releasing the fender.

In Fig. 1, the ordinary brake lever 59 is shown as connected in the customary way to friction brakes of the rear wheels. The said friction clutches, which are of ordinary or of any suitable construction, are applied to the rear wheels 2 in the usual way and are indicated as entireties by the numeral 60.

What I claim is:

1. The combination with a motor propelled vehicle having a brake, of a fender applied to the front portion of said vehicle and mounted for upward and downward movements, means normally holding said fender raised, a power device exerting a force tending to throw said fender downward, a mechanical trip for releasing said fender, and a mechanical actuating connection between said fender and brake, whereby the force exerted on said fender to throw the same downward when released, will also set said brake.

2. The combination with a motor propelled vehicle having a brake, of a fender applied to the front portion of said vehicle and mounted for upward and downward movements, mechanical means normally holding said fender raised, a power device exerting a force tending to throw said fender downward, a trip for releasing said fender, and a mechanical actuating connection including a cable and cable guides between said fender and brake, whereby the force exerted on said fender to throw the same downward when released, will also set said brake.

3. The combination with a motor propelled vehicle having a brake, of a vertically movable fender applied to the front portion of said vehicle, yielding means tending to throw said fender downward, mechanical means normally holding said fender raised, a trip for releasing said fender, and a mechanically operated connection between said brake and fender whereby downward movement of said fender will set said brake.

4. The combination with a motor propelled vehicle, of a vertically movable fender applied to the front portion of said vehicle, yielding means tending to throw said fender downward, mechanical means normally holding said fender raised, a trip for releasing said fender, and mechanically operated connections between said fender and said motor whereby downward movement of said fender will throw said motor out of action.

5. The combination with a motor propelled vehicle having a brake, of a vertically movable fender applied to the front portion of the said vehicle, yielding means tending to throw said fender downward, mechanical means normally holding said fender raised, an automatic trip for releasing said fender, and a mechanically operated connection between said brake and fender whereby downward movement of said fender will set said brake.

6. The combination with a motor propelled vehicle, of a vertically movable fender applied to the front portion of said vehicle, yielding means tending to throw said fender downward, mechanical means normally holding said fender raised, an automatic trip for releasing said fender, and mechanically operated connections between said fender and said motor whereby downward movement of said fender will throw said motor out of action.

7. The combination with a motor propelled vehicle having a brake of a vertically movable fender applied to the front portion of said vehicle, yielding means tending to throw said fender downward, means normally holding said fender raised, an automatic trip and a manually operative trip for releasing said fender, and a mechanically operated connection between said brake and fender whereby downward movement of said fender will set said brake.

8. The combination with a motor propelled vehicle, of a vertically movable fender applied to the front portion of said vehicle, yielding means tending to throw said fender downward, means normally holding said fender raised, an automatic trip and a manually operative trip for releasing said fender, and mechanically operated connections between said fender and said motor whereby downward movement of said fender will throw said motor out of action.

9. The combination with a vehicle having a brake, of an explosive engine carried by said vehicle and connected to the traction wheels thereof by a transmission mechanism including a clutch, the said engine also having a sparking circuit including a circuit breaker, a fender movably mounted on the front portion of said vehicle and normally held in a raised position, a trip for releasing said fender, and mechanically operated connections between the said fender and the said brake, and the said clutch and the said circuit breaker, whereby when said fender is lowered said brake will be set, and said clutch released and the said circuit breaker moved into an open position to thereby stop the engine.

In testimony whereof I affix my signature in presence of two witnesses.

WILLIAM A. LINQUIST.

Witnesses:
 HARRY D. KILGORE,
 F. D. MERCHANT.